Figure 4:
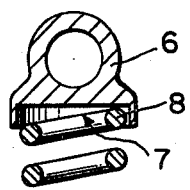

United States Patent [19]

Milly

[11] 4,348,016

[45] Sep. 7, 1982

[54] PROCESS AND DEVICE FOR SUSPENSION OF VEHICLE WHEELS

[76] Inventor: Lucien Milly, 1, rue du Cardinal Mercier, Paris, France

[21] Appl. No.: 69,495

[22] Filed: Aug. 24, 1979

[30] Foreign Application Priority Data

Sep. 6, 1978 [FR] France .............................. 78 25588
May 21, 1979 [FR] France .............................. 79 12849

[51] Int. Cl.³ ..................... B60G 17/02; B62K 25/10; F16F 1/06; F16F 1/12
[52] U.S. Cl. ..................................... 267/177; 280/284
[58] Field of Search .............. 267/8 R, 34, 61 S, 166, 267/167, 170, 175, 177, 182, 60, 61 R; 280/276, 275, 284, 283

[56] References Cited

U.S. PATENT DOCUMENTS

3,701,544 10/1972 Stankovich ...................... 280/276

FOREIGN PATENT DOCUMENTS

| 913611 | 9/1946 | France . |
| 945777 | 5/1949 | France . |
| 1006768 | 4/1952 | France . |
| 2153041 | 4/1973 | France . |
| 236279 | 6/1945 | Switzerland . |
| 745843 | 3/1956 | United Kingdom . |
| 852503 | 10/1960 | United Kingdom . |

*Primary Examiner*—Douglas C. Butler
*Attorney, Agent, or Firm*—Schwartz, Jeffery, Schwaab, Mack, Blumenthal & Koch

[57] ABSTRACT

A process and apparatus for suspension of a vehicle wheel, particularly for motorcycles, mopeds and bicycles, the springs of which comprise an adjusting device. The process comprises the step of using a spring or springs having a neutralizable end part adapted to adjust the elastic deflection of the spring under the action of a load either progressively or by predetermined portions. Also, the apparatus comprises, in combination with a helical suspension spring, a hollow semi-collar, forming a nut, provided with peripheral knurl for permitting the manual handling thereof. The nut has two internal threads having the same pitch, over slightly more than a half-turn, for reacting, on the one hand, with the thread of a central non-deformable socket, and on the other hand, with the helical outside of the spring, for permitting locking of these three elements between themselves to achieve a predetermined height as a function of the variation of the supported load.

3 Claims, 6 Drawing Figures

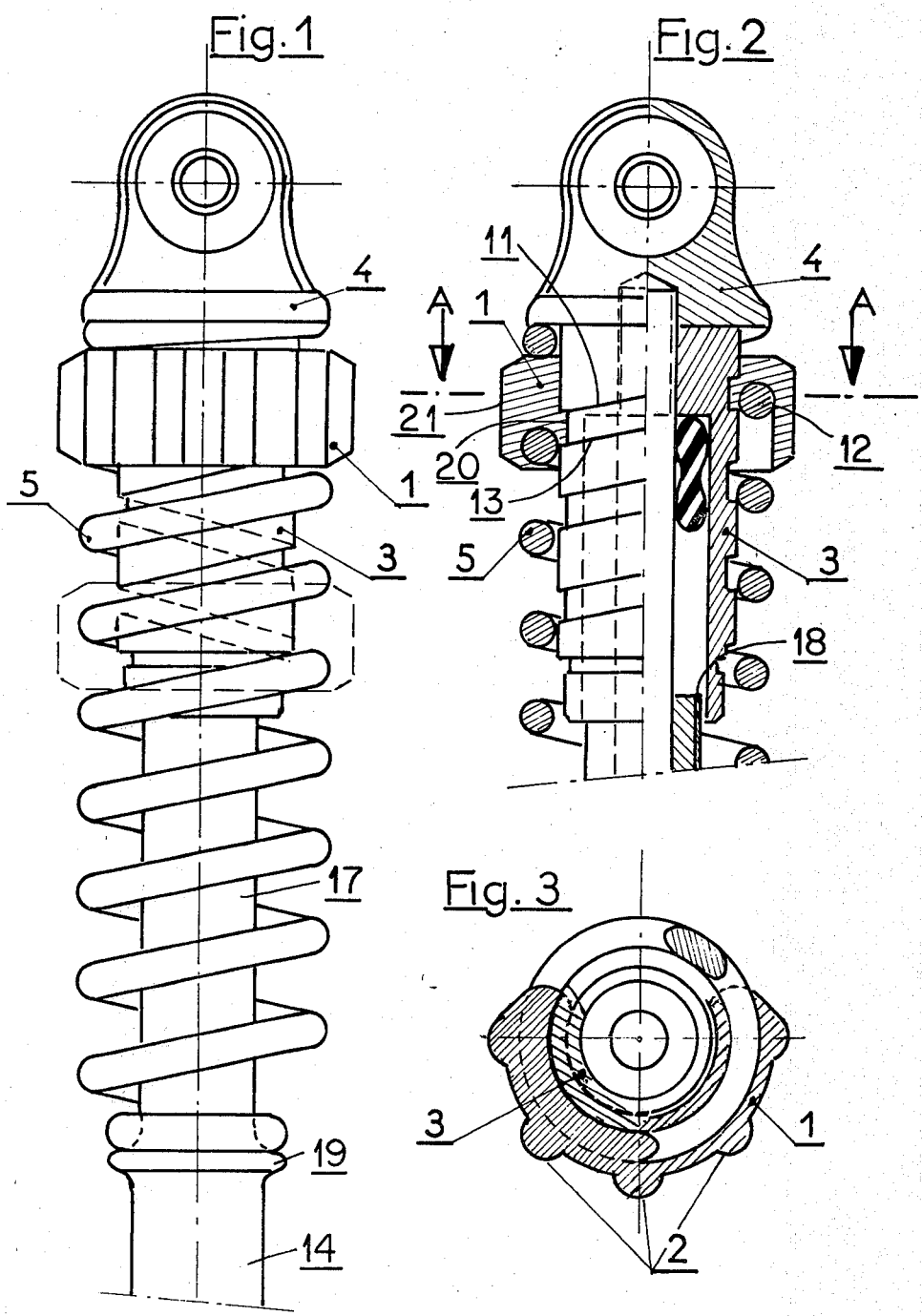

PROCESS AND DEVICE FOR SUSPENSION OF VEHICLE WHEELS

The present invention relates to helical compression spring devices for the suspension of vehicle wheels, particularly vehicles having two pedal wheels, such as motorcycles, motorized bicycles and bicycles. It is intended to correct, with great simplicity, the seating level as well as the mean frequency of oscillation to hold these characteristics substantially constant and independent of the variations in the loads being supported by the vehicle.

According to the present invention the above-mentioned constancy of the double characteristics is obtained by neutralizing a variable portion of one or more of the helical springs, such as to make their deflection, i.e. their depression, decrease as a function of the increase in the loads that they support. This is achieved by manual adjustment of a member to produce simultaneous autocompensation, as well in the seat level of the vehicle as in the periodicity of the oscillations of the springs in order to make the vehicle comfort, which is linked with the periodicity of the spring oscillations, equally substantially constant and independent of the variations in the load being supported, which is, if not indispensable, at least very desirable.

Therefore, according to the present invention there is provided a process for the suspension of a vehicle wheel, particularly for motorcycles, motorized bicycles and bicycles, the springs of which comprise an adjusting device, comprising the step of using a spring or springs having a neutralizable end part adapted to participate to the elastic deflection under the action of a load either progressively or by predetermined portions.

According to the present invention there is also provided a suspension device, comprising in combination with a helical suspension spring, a hollow semi-collar, forming a nut, provided with peripheral knurls for permitting the manual handling thereof and two internal threads having the same pitch, over a slightly more than a half-turn, for reacting respectively, on the one hand with the thread of a central non-deformable socket and on the other hand with the helical outside of the spring, for permitting a locking of these three elements between themselves to a predetermined height in function of the variation of the supported load.

Figure 5:
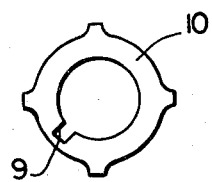

The above objects as well as others will be better understood from the following description having reference to the attached non-limitative drawings wherein:

FIG. 1 shows in elevation view, the upper part of a first embodiment of one of the devices called "suspension device", of the rear wheel of a moped, FIG. 2 shows in elevation view the same part of the suspension device but cut off and comprising partial cross sections of the essential elements, FIG. 3 shows a cross section along the line A—A of FIG. 2, FIG. 4 shows a schematic elevation view and at a reduced scale, of a further embodiment of the part of a suspension device according to the present invention, FIG. 5 shows in plane view an adjusting collar of the device shown in FIG. 4.

Figure 6:
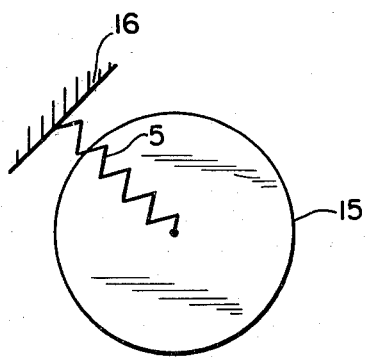

FIG. 6 schematically shows a vehicle wheel, body and suspension spring to illustrate the environment in which the suspension device of the present invention is used.

Referring to FIGS. 1, 2, 3, there is shown the upper part of a suspension device comprising a semi-annular nut 1, having peripheral gripping ribs for manual handling, such as 2, and two inner threaded parts 11, 12, having the same pitch, running over slightly more than a half-turn. One of the threads has a rectangular cross-section and is provided in the bore to mesh with a corresponding outer thread 13 of a central sleeve 3 fixedly connected to an upper connector 4 of the suspension device. The other thread 12 is a guideway semi-circular in cross section and is provided in the body of the nut 1. This second thread winds around the body of the nut and opens at both faces thereof so that a helical spring 5 may be slid through it. Manual handling of the nut 1, in rotation, allows variable longitudinal displacement thereof from an upper position shown in full lines in FIG. 1, to a lower portion shown in broken lines. As implicit from the foregoing discussion as to the upper connector 4, there is also a lower connector or securing member 14, and it is of course obvious that this will be coupled with the wheel of the vehicle. A very schematic diagram of a conventional wheel 15, vehicle body 16 and spring 5 extending therebetween is shown in FIG. 6. It will be apparent from FIGS. 1 and 2 that the lower connecting member 14 includes a rod 17 and a free end 18 and it can be particularly seen by referring to FIG. 2 that free end 18 fits telescopically within the central sleeve 3. As will also be apparent from FIG. 1, the rod 17 has a peripheral shoulder means 19 thereon away from the rod's free end, which peripheral shoulder means the lower end of the spring 5 abuts. It will also be apparent from the drawing, particularly FIG. 2, that the control nut 1 is an integral unit, and in particular is of one piece. It will further be apparent from the same figures that the control nut includes a radially inner portion 20 and a radially outer portion 21, the inner portion being disposed between the control sleeve and the spring, the outer portion being disposed radially outside of the spring.

Thus, if the suspension spring 5 is calculated to support a predetermined maximum load, with an appropriate stress ratio, and a minimum predetermined load, it is possible, by properly positioning nut 1, to select an oscillation period that will be comfortable, generally slightly less than one second. The same comfort can be obtained, when the supporting load increases, as well as the same level of the seat, at least as long as the increase in load and therefore in the total deflection of the useful and effective windings is compensated for by a "neutralization" of the deflection on the same order of the upper part of the spring 5 by means of the collar 1, which is capable of locking the spring against the central non-deformable socket 3. As is apparent from and implicit in the foregoing, the adjustment is accomplished by selecting the required amount of spring neutralization, determining the direction of collar rotation to effect the same, manually gripping the gripping ribs, and twisting the control nut in a determined direction. Of course, the twisting is terminated when the selected amount of neutralization has been achieved by the movement of the control nut.

In fact, as by theory, the deflection increase of the lower effective part of the spring 5 is slightly compensated for by the absence of any fractional deflection of the upper neutralized part. Because the nut 1 is locked on the non-deformable socket 3, it is always possible to have an overall deflection and therefore a mean oscillation period which is substantially constant and, at the same time, to have a constant seat level in spite of variations of the supported loads.

In FIGS. 4 and 5, there is shown a suspension device of the type above described, but simplified, due to the upper connecting means 6 being combined with a helical slope 7 and the elimination of the usual horizontal "short interval" support winding. That is, the terminal spire or turn is no longer horizontal but is obliquely disposed since it terminates along its winding pitch as shown in FIG. 4. As indicated above, this is compensated for by a corresponding shape of the base which receives the terminal spire as shown at 7 in FIG. 4. This construction has the double advantage of manufacturing savings and the capability of using a complete adjustment nut (rather than the partial nut of FIGS. 1–3) by the insertion of the spring 8 through a corresponding opening 9 of the adjustment nut 10 (see FIG. 5). At the same time, the two different inner threaded parts, as described above in connection with the embodiment of FIGS. 1–3, interact in the same way for assuming the same function as also explained above.

It is to be noted that the present invention is not limited to only the embodiments shown and described but, on the contrary, it covers all the embodiments within its scope. In particular, the invention envisions embodiments combining the means and the process of one embodiment with the means of process of the other embodiment or equivalents thereof or simply comparable elements, in particular, by reversal or transposition of the above-mentioned elements or by transfer of one characteristic of one embodiment to the other embodiment.

As an example for such an embodiment, which is covered by the present invention, it should be noted the transposition of the above-mentioned elements for new application to the suspensions involving torsion or torque bars is easy to carry out by sliding the socket worked out along the appropriate external section of the part of the bar to be neutralized, inasmuch as the sliding socket must be immobilized in rotation. It should also be emphasized that the control of the sliding of the socket may be carried out by progressive movement or by small portions of the part of the bar to be neutralized.

It should also be added that it is possible and within the scope of the invention to substitute the manual and sporadic control of the adjusting collar, for example 1 or 10, by a motorized and automatic control means, particularly in case when they are applied to automobile vehicle springs. This can be done by coupling concentrically to the collar 1 or 10, a cog-wheel in association with a tangent screw, adapted to be driven in either direction, for example by a flexible transmission gear, in order to establish the correct height of the spring seat before the driving and under static load. This may be done by known servo-mechanisms and by a height detector, which is used only for a short period of time, before each successive driving. This is more economical and simple than the usual height correcting devices, be they hydraulic and pneumatic, since the usual devices necessitate continuous operation and running, particularly due to the significant and continuous variations of the temperatures of their fluids.

As an example of applications to other vehicles having two wheels within the scope of the present invention, application of the above-mentioned devices to bicycles, in combination with a known linkage system of the linking of the rear wheel with respect to the frame, as well as the application of the above-mentioned suspension devices to the front wheels for improving the overall comfort of vehicles, with or without motors, which have two wheels.

I claim:

1. A spring suspension device for a two-wheel vehicle with a body comprising: an upper and a lower securing member to be connected, respectively, with the body of the vehicle and with a wheel of the vehicle; a hollow control sleeve depending from and solid with said upper member and a rod of said lower member telescopically received at one end within said sleeve, said rod having peripheral shoulder means thereon away from its telescoping free end; threads formed on the outer surface of said sleeve; a control nut having a bore with first and second threads therein, said first threads meshing with the threads of said sleeve; a suspension spring, about said lower member and sleeve, having one end abutting said shoulder means and another end abutting said upper member, and wherein said but has a body, said second threads being in the form of a through helical guideway in said body of said nut for the passage of the coils of said spring, said nut being slideable along said spring and sleeve to vary the active length of said spring.

2. A method for adjusting an elongated coil suspension spring of a two-wheel vehicle, the spring having upper and lower ends and being coupled with a fixed central sleeve with exterior threads, the sleeve being disposed interiorly of the spring, the spring having an integral control nut coupled therewith, the control nut being rotatable with respect to the spring, the control nut having an inner portion between the sleeve and spring and an outer portion outside the spring, the control nut having means on its outer portion for effecting manual gripping thereof and first and second threads on its inner portion, said first threads engaging said threads of said central sleeve, said second threads being in the form of a helical guideway for engaging the coil of the spring for moving the control nut along the spring, the method comprising the steps of:
    (a) selecting an amount of spring neutralization required to adjust the mean frequency of oscillation of the spring in accordance with vehicle load;
    (b) determining the direction of control nut rotation necessary for effecting the selected neutralization;
    (c) manually gripping the manual gripping means of the control nut;
    (d) thereafter twisting the control nut in the determined direction of rotation;
    (e) moving the control nut lengthwise along said spring by continuing said twisting action;
    (f) neutralizing a portion of the length of the spring by terminating said twisting action after said control nut has been moved along said spring to a point which provides the selected neutralization, said neutralization being effected by locking the spring against the central sleeve via the first and second threads on said control nut to render ineffective that portion of the spring between the upper end of the spring and the control nut.

3. A spring suspension device for a two-wheel vehicle with a body comprising:
    an upper securing member for connection with the body of the vehicle;
    a lower securing member for connection with the wheel of a vehicle;
    a central sleeve fixedly connected to and depending from said upper securing member, said sleeve having a hollow interior; said central sleeve having an outer thread thereon; said lower member including a rod having a free end, said free end extending into said hollow interior of said sleeve, said rod having a peripheral shoulder means thereon away from said free end;

an elongated helical suspension spring disposed between said upper and lower securing members and surrounding said central sleeve, said spring having one end abutting said shoulder means and another end abutting said upper member;

a one piece control nut having a central bore, said control nut including a radially inner portion and a radially outer portion, said inner portion being disposed between said central sleeve and said spring, said outer portion being disposed radially outside of said spring, said outer portion defining a periphery of said control nut, said periphery including a plurality of gripping ribs for manual handling of said control nut, said inner portion including first and second threads both having the same pitch and both extending for slightly more than a half turn, said first thread meshing with said outer thread of said central sleeve, said second thread being in the form of a through helical guideway in said inner portion, whereby manual twisting of said control nut effects displacement thereof along said spring in the longitudinal direction.

* * * * *